United States Patent
Burger

(10) Patent No.: US 12,241,149 B2
(45) Date of Patent: Mar. 4, 2025

(54) ELECTRICAL CONTACT ELEMENT

(71) Applicant: ERNI INTERNATIONAL AG, Brüttisellen (CH)

(72) Inventor: Michael Burger, Pforzheim (DE)

(73) Assignee: ERNI INTERNATIONAL AG, Brüttisellen (CH)

( * ) Notice: Subject to any disclaimer, the term of this patent is extended or adjusted under 35 U.S.C. 154(b) by 522 days.

(21) Appl. No.: 17/607,826

(22) PCT Filed: May 5, 2020

(86) PCT No.: PCT/EP2020/062402
§ 371 (c)(1),
(2) Date: Oct. 29, 2021

(87) PCT Pub. No.: WO2020/244865
PCT Pub. Date: Dec. 10, 2020

(65) Prior Publication Data
US 2022/0209447 A1 Jun. 30, 2022

(30) Foreign Application Priority Data
Jun. 5, 2019 (DE) .................... 10 2019 115 239.9

(51) Int. Cl.
| | |
|---|---|
| *C22C 9/06* | (2006.01) |
| *B32B 15/01* | (2006.01) |
| *B32B 15/04* | (2006.01) |
| *C22C 5/02* | (2006.01) |
| *C22C 5/04* | (2006.01) |
| *C22C 9/00* | (2006.01) |
| *C22C 9/04* | (2006.01) |
| *C22C 19/03* | (2006.01) |
| *H01R 13/03* | (2006.01) |

(52) U.S. Cl.
CPC .............. *C22C 9/06* (2013.01); *B32B 15/018* (2013.01); *B32B 15/04* (2013.01); *C22C 5/02* (2013.01); *C22C 5/04* (2013.01); *C22C 9/00* (2013.01); *C22C 9/04* (2013.01); *C22C 19/03* (2013.01); *H01R 13/03* (2013.01)

(58) Field of Classification Search
None
See application file for complete search history.

(56) References Cited

U.S. PATENT DOCUMENTS

| | | | |
|---|---|---|---|
| 4,268,568 A | 5/1981 | Sard et al. | |
| 6,627,329 B1 * | 9/2003 | Shintani | C25D 3/62 439/524 |
| 2004/0038072 A1 * | 2/2004 | Miura | H01R 13/03 428/673 |
| 2010/0101831 A1 | 4/2010 | Kobayashi | |
| 2012/0319268 A1 * | 12/2012 | Kagimoto | H01L 24/16 257/734 |
| 2016/0064846 A1 * | 3/2016 | Tadokoro | C25D 5/12 439/886 |
| 2017/0149157 A1 * | 5/2017 | Anderson | H01R 12/58 |

FOREIGN PATENT DOCUMENTS

| | | |
|---|---|---|
| DE | 7422332 U | 10/1974 |
| EP | 586300 A1 | 3/1994 |
| JP | H0711478 U | 2/1995 |
| JP | H10233121 A | 9/1998 |
| JP | 2013204102 A | 10/2013 |

OTHER PUBLICATIONS

German Examination Report issued in German Patent Application No. 102019115239.9 dated Feb. 21, 2020. English translation not available.
International Search Report issued in PCT Application No. PCT/EP2020/062402 dated Aug. 18, 2020. English translation not available.

* cited by examiner

*Primary Examiner* — Xiaobei Wang
(74) *Attorney, Agent, or Firm* — Weber Rosselli & Cannon LLP

(57) ABSTRACT

An electrical contact element for a plug-in connector has a metallic base body and a wear layer applied to the base body. The wear layer consists of pure ruthenium or of an alloy with the components 50-100% w/w ruthenium, 0-30% w/w nickel, 0-20% w/w chromium, 0-20% w/w cobalt, 0-20% w/w platinum and 0-1% w/w further alloy elements. A metallic intermediary layer is arranged between the base body and the wear layer, which has a thickness ranging from 1.5 μm to 4.0 μm.

9 Claims, 2 Drawing Sheets

ELECTRICAL CONTACT ELEMENT

The present invention relates to an electrical contact element for a plug-in connector.

PRIOR ART

Electrical plug-in connectors generally have one or more electrical contact elements and one or more insulating bodies. The contact elements are here usually designed as male elements or as female elements. These are produced from base materials which are not resistant to corrosion. Often these are copper alloys. In order to ensure the function of the contact elements over the lifetime of the plug-in connector, thin layers of other metals are therefore applied to the base material. These can comprise an intermediary layer and a wear layer.

The intermediary layer can have various tasks. It can improve the adhesion of the wear layer on the base material, produce a mechanical compensation between base material and wear layer and prevent diffusion processes between the wear layer and the base material taking place. The intermediary layer often consists of copper or nickel.

The wear layer, which is also referred to as the functional layer, is located on the intermediary layer. The wear layer extends the technically useful life of the contact element, can improve the electrical transmission, and protect the layers lying below it from corrosion. It can consist of soft, non-inert metals, such as tin or silver. In plug-in connectors in the automotive industry, silver, for example, is very prevalent as the wear layer. In plug-in systems with particularly high requirements of reliability and lifetime, wear layers made of very expensive, corrosion-resistant noble metals or alloys thereof are often used. Thus, gold-cobalt alloys or palladium-nickel alloys, for example, are used.

An object of the present invention is to provide an electrical contact element, which is suitable for use in an electrical plug-in connector and can be produced more cost-effectively than conventional electrical contact elements. Here, the reliability and lifetime of conventional contact elements is nevertheless to be obtained.

DISCLOSURE OF THE INVENTION

This object is solved by an electrical contact element for a plug-in connector which has a metallic base body or a wear layer applied to the base body. The wear layer can here be applied directly on the metallic base body or one or more further layers can be arranged between the metallic base body and the wear layer. The wear layer consists of the following alloy elements: 50 to 100% w/w ruthenium, 0 to 30% w/w nickel, 0 to 20% w/w chromium, 0 to 20% w/w cobalt, 0 to 20% w/w platinum and 0 to 1% w/w further alloy elements. Here, the sum of the alloy elements is 100% w/w. The wear layer can thus consist both of pure ruthenium or of a ruthenium alloy, which can include up to 50% further alloy elements. While nickel, chromium, cobalt and platinum can be alloyed in the specified amounts, amounts of further elements are preferably avoided. An amount of up to 1% w/w of further alloy elements in the alloy, for example impurities, is, however, acceptable. In an embodiment of the electrical contact element in which the wear layer substantially consists of pure ruthenium, this contains 99 to 100% w/w and a maximum of 1% w/w further alloy elements, wherein the sum of the alloy elements is, in turn, 100% w/w. According to the invention, it has been found that the use of such a wear layer offers a similarly good electrical transmission and a similarly good corrosion protection as can be achieved, for example, with the wear layer made of silver. The use of pure ruthenium or the ruthenium alloy described, however, enables a more cost-effective production of the electrical contact element in comparison.

To ensure a good degree of corrosion protection, it is preferred that the wear layer has a thickness in the range of from 0.15 µm to 1.50 µm. Particularly preferably, the thickness ranges from 0.30 µm to 1.00 µm. The wear layer used according to the invention offers such a good degree of corrosion protection and such a good electrical transmission that these properties cannot further be substantially improved by a further increase of the layer thickness. In contrast, for example when using a conventional wear layer made of silver, a layer thickness of at least 3 µm is usually required, so that the electrical contact element at least fulfils the requirements placed of corrosion resistance and electrical transmission. Accordingly, the invention not only enables the production of the electrical contact element when using more cost-effective materials, but also a saving of the amount of material by using a particularly thin wear layer.

A metallic intermediary layer is arranged between the base body and the wear layer. Preferably, the intermediary layer is the only layer that is arranged between the wear layer and the base body, such that the base body is directly connected to the intermediary layer and the intermediary layer is directly connected to the wear layer. As in the conventional construction of the electrical contact element, the intermediary layer improves the adhesion of the wear layer on the base body, ensures a mechanical compensation between the base body and the wear layer and prevents diffusion processes between the wear layer and the base body.

In an embodiment of the contact element, the intermediary layer contains 99 to 100% w/w copper and 0 to 1% w/w further alloy elements. In another preferred embodiment of the contact element, the intermediary layer contains 99 to 100% w/w nickel and 0 to 1% w/w further alloy elements. The sum of the alloy elements is here 100% w/w. The amount of further alloy elements should preferably be as small as possible, yet their presence can possibly not be completely precluded because of impurities.

The thickness of the intermediary layer is 1.5 µm to 4.0 µm and preferably 2.0 µm to 3.0 µm.

Furthermore, it is preferred that a metallic and/or organic slide layer is arranged on the wear layer. On the one hand, the slide layer can improve the slide properties of electrical contact elements, in particular of female elements and male elements. Thus, it contributes to the wear layer remaining functional under mechanical frictional stress. On the other hand, it can also optimise the electrical transmission between the electrical contact elements. When the slide layer contains both metallic and organic components, it is then preferred that a metallic partial layer is attached directly to the wear layer and an organic partial layer is attached to this metallic layer. The metallic partial layer and the organic partial layer then together form the slide layer.

A particularly suitable metallic material for the slide layer is pure gold or a gold alloy, which consists of the following alloy elements: 98.5 to 100.0% w/w gold, 0 to 0.5% w/w cobalt and 0 to 1.0% w/w further alloy elements. The sum of the alloy elements is here 100% w/w.

Particularly suitable organic materials of the slide layer are at least one fluoropolymer and/or at least one fatty acid salt. The fluoropolymer can be, for example, perfluoropolyether (PFPE) or polytetrafluoroethylene (PTFE). The fatty acid salt can be, for example, lithium-12-hydroxystearate.

The thickness of the slide layer is preferably in the range of from 0.05 µm to 0.25 µm. Already such thin slide layers are sufficient in order to give the electrical contact element good slide properties, such that a substantial thickness increase of the entire coating is not carried out by applying the slide layer to the wear layer.

The wear layer of the electrical contact element according to the invention can particularly advantageously be used when the base body consists of copper, a low alloyed copper alloy or a brass. In this case, it consists of the following alloy elements: 50 to 100% w/w copper, 0 to 45% w/w zinc and 0 to 5% w/w further alloy elements. The sum of the alloy elements is here 100% w/w. Even though the sum of the further alloy elements herein can be up to 5% w/w, it is preferred that each individual further alloy element does not constitute more than 2% w/w of the entire alloy. Furthermore, it is preferred that only the further alloy elements beryllium, chromium, iron, cobalt, magnesium, manganese, nickel, phosphorous, sulphur, silicon, tellurium, titanium, tin, and zirconium may be contained in the alloy in each case up to 2% w/w and all further alloy elements not mentioned in this list are present in each case to a maximum of 1% w/w.

The electrical contact element according to the invention can be produced with good technical properties, without having to use large amounts of expensive noble metals in the process.

BRIEF DESCRIPTION OF THE DRAWINGS

Exemplary embodiments of the invention are depicted in the drawings and are explained in more detail in the description below.

EXEMPLARY EMBODIMENTS OF THE INVENTION

Figure 1:
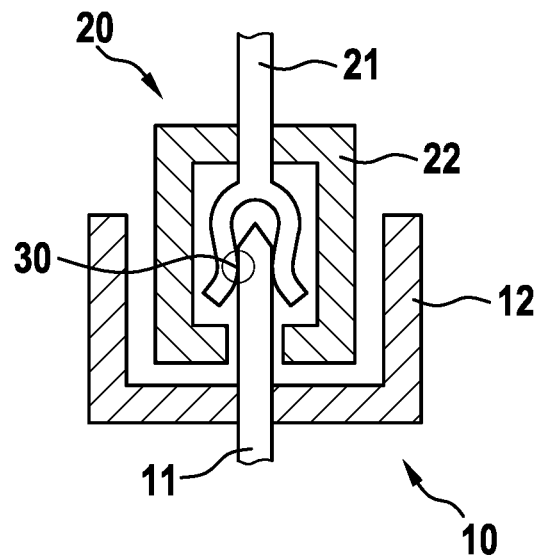
FIG. 1 shows a schematic longitudinal sectional depiction of an arrangement made of two electrical plug-in connectors.

FIG. 1 shows the schematic construction of a plug-in connector pair. A first plug-in connector 10 has an electrical contact element 11 in the form of a male element. This is surrounded by a first insulation body 12 made of a plastic. A second plug-in connector 20 has a second electrical contact element 21 in the form of a female element. This is surrounded by a second insulation body 22 made of a plastic. When the two plug-in connectors 10, 20 are plugged into each other in the manner depicted, then the second insulation body 22 is pushed into the first insulation body 12, wherein the first electrical contact element 11 is led into the second electrical contact element 21. In doing so, it bends the tongues of the second contact element 21 apart, which are then pressed fixedly onto the first contact element 11 by their spring force. In a contact region 30 in which the two contact elements 11, 21 are contacted, an electrical transmission is then possible.

Figure 2:
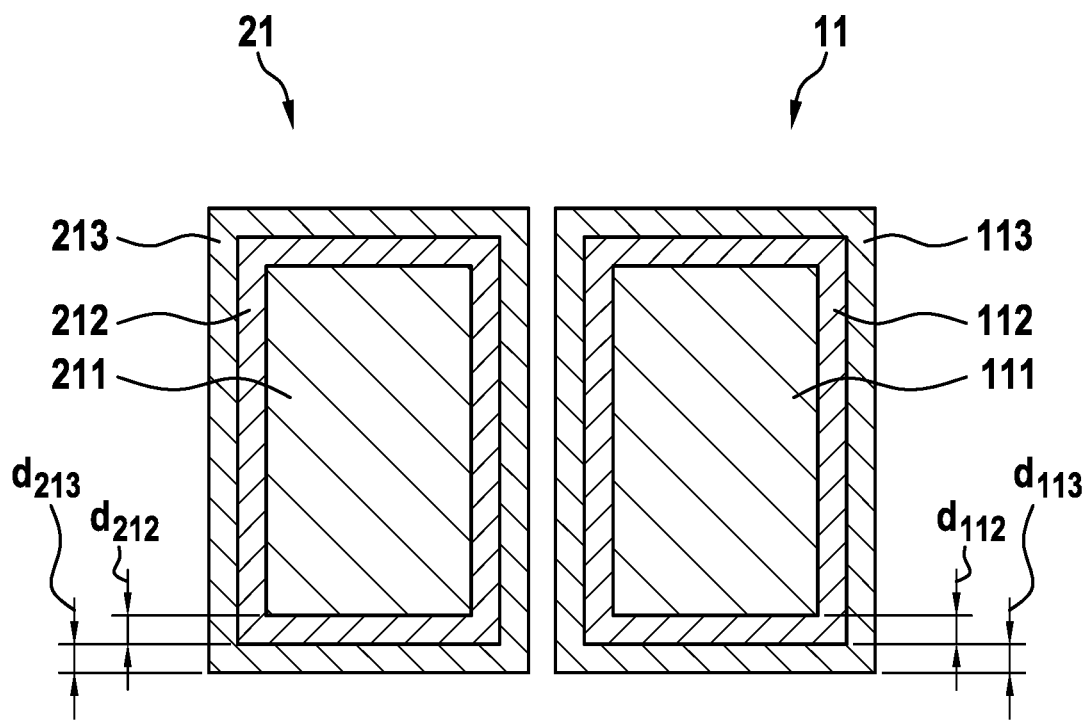
FIG. 2 shows a cross-sectional depiction of a contact region between two electrical contact elements in a comparative example.

In electrical plug connectors 10, 20, which have contact elements 11, 21 according to the prior art, the construction, depicted in FIG. 2, of the contact elements 11, 21 is present in the contact region 30. The first contact element 11 has a base body 111, an intermediary layer 112 arranged on the base body and a wear layer 113 arranged on the intermediary layer. The second contact element 21 has a base body 211, an intermediary layer 212 arranged on the base body 211 and a wear layer 213 arranged on the intermediary layer 212. The base bodies 111, 211, the intermediary layers 112, 212 and the wear layers 113, 213 each have the composition in weight percent specified in Table 1:

TABLE 1

|  | Base body 111, 211 | Intermediary layer 112, 212 | Wear layer 113, 213 |
| --- | --- | --- | --- |
| Ag |  |  | 100 |
| Au |  |  |  |
| Co |  |  |  |
| Cu | 100 |  |  |
| Ni |  | 100 |  |
| Ru |  |  |  |
| PTFE |  |  |  |

In the present example, the intermediary layers 112, 212 each have a thickness $d_{112}$, $d_{212}$ of 3 µm, and the wear layers 113, 213 each have a thickness of $d_{113}$, $d_{213}$ of 4 µm. The wear layers 113, 213 come into contact in the contact region 30, wherein it can lead to an attrition of silver. The large amount of silver necessary for the production of the wear layer leads to the production of the electrical contact elements 11, 21, being expensive.

Figure 3:
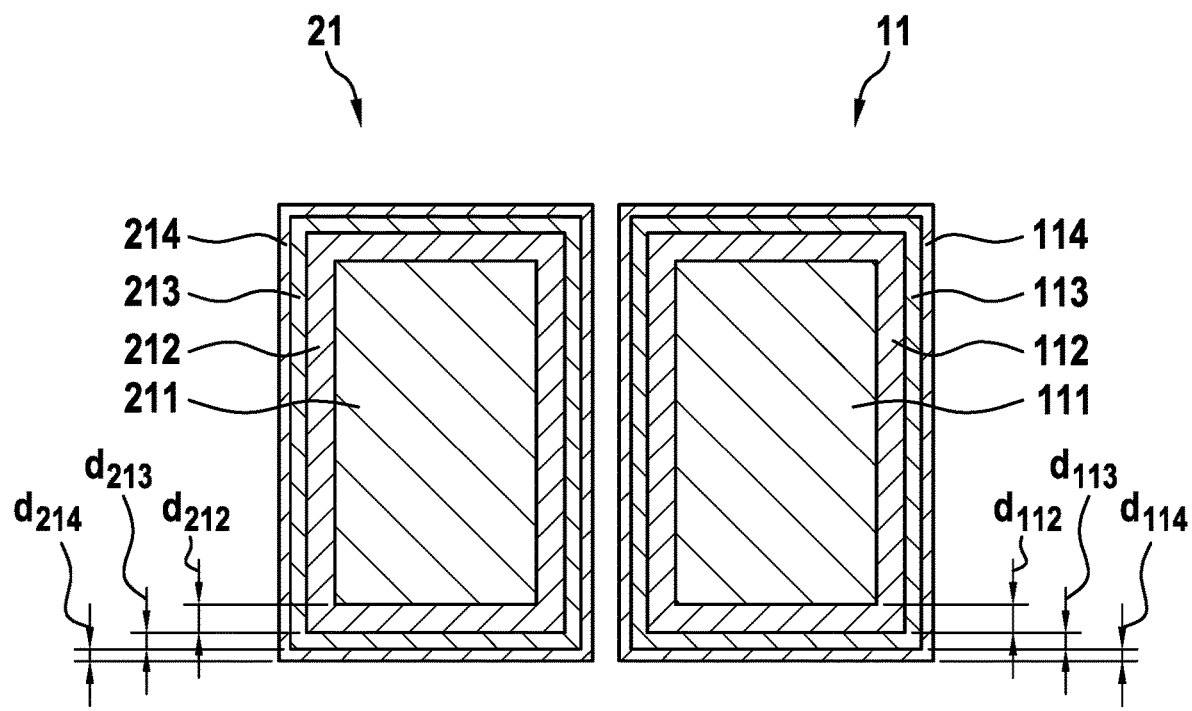
FIG. 3 shows a cross-sectional depiction of a contact region of two electrical contact elements according to exemplary embodiments of the invention.

FIG. 3 shows the construction of the electrical contact elements 11, 21 according to several exemplary embodiments of the invention, which can be used in the pair of plug-in connectors 10, 20 according to FIG. 1. In addition to the construction of the electrical contact elements 11, 21 already depicted in FIG. 2 made of base bodies 111, 211, intermediary layers 112, 212 and wear layers 113, 213, the contact elements 11, 21 each have an additional slide layer 114, 214 on their wear layers 113, 213 according to these exemplary embodiments of the invention. This leads to no contacting of the wear layers 113, 213 in the contact region 30, but instead there is a contacting of the slide layers 114, 214. While the thickness of the intermediary layers 112, 212 in the exemplary embodiments of the invention is in accordance with the thickness of the intermediary layers 112, 212 in the comparative example, the exemplary embodiments according to the invention make do with substantially thinner wear layers 113, 213, the thickness $d_{113}$, $d_{213}$ of which is respectively only 0.65 µm. This leads to a considerable material saving over the comparative example. In the exemplary embodiments according to the invention, the slide layers 114, 214 each have a thickness $d_{114}$, $d_{214}$ of 0.10 µm. Each wear layer 113, 213 itself, together with its respective slide layer 114, 214, is thus thinner than the wear layer 113, 213 in the comparative example.

In a first exemplary embodiment of the invention, the components of the contact elements 11, 21 have the composition in weight percent stated in Table 2.

TABLE 2

|  | Base body 111, 211 | Intermediary layer 112, 212 | Wear layer 113, 213 | Slide layer 114, 214 |
| --- | --- | --- | --- | --- |
| Ag |  |  |  |  |
| Au |  |  |  | 99.8 |
| Co |  |  |  | 0.2 |
| Cu | 100 |  |  |  |
| Ni |  | 100 |  |  |

TABLE 2-continued

| | Base body 111, 211 | Intermediary layer 112, 212 | Wear layer 113, 213 | Slide layer 114, 214 |
|---|---|---|---|---|
| Ru | | | 100 | |
| PTFE | | | | |

The intermediary layer, which consists of pure silver in the comparative example, thus consists of pure ruthenium in the first exemplary embodiment. This leads to cost savings, not only because of less metal being used for the wear layer, but also because of the use of a more cost-effective metal. The slide layer consists of an alloy of gold and cobalt, which enables outstanding electrical transmission and, in addition, due to the softness of this alloy, has better slide properties than the silver used in the comparative example. However, the slide layer is so thin that it does not lead to any mentionable cost increase of the contact elements 11, 21 despite the noble metal used.

In a second exemplary embodiment of the electrical contact elements 11, 21 according to the invention, their components have the composition stated in Table 3 in weight percent:

TABLE 3

| | Base body 111, 112 | Intermediary layer 112, 212 | Wear layer 113, 213 | Slide layer 114, 214 |
|---|---|---|---|---|
| Ag | | | | |
| Au | | | | 99.8 |
| Co | | | | 0.2 |
| Cu | 100 | | | |
| Ni | | 100 | | |
| Ru | | | 100 | |
| PTFE | | | | |

The pure ruthenium of the wear layers 113, 213 according to the first exemplary embodiment have here been replaced by a ruthenium-nickel alloy. It has been established that the properties of the electrical contact elements according to the comparative example in relation to corrosion resistance and electrical transmission can also still be achieved or even exceeded when using such an alloy.

In a third exemplary embodiment of the electrical contact elements 11, 21, their components have the composition stated in Table 4 in weight percent:

TABLE 4

| | Base body 111, 211 | Intermediary layer 112, 212 | Wear layer 113, 213 | Slide layer 114, 214 |
|---|---|---|---|---|
| Ag | | | | |
| Au | | | | |
| Co | | | | |
| Cu | 100 | | | |
| Ni | | 100 | 10 | |
| Ru | | | 90 | |
| PTFE | | | | 100 |

In comparison to the first exemplary embodiment, the metallic slide layers 114, 214 have been replaced by organic slide layers, which each consist of PTFE. It has been established that, by dispensing with an expensive noble metal, outstanding slide properties of the contact elements 11, 21 can nevertheless be achieved in the third exemplary embodiment, wherein the electrical transmission is nevertheless not inferior to that of the electrical contact elements 11, 21 in the comparative example.

All three exemplary embodiments described of the electrical contact elements 11, 21 according to the invention enable a cost-effective replacement of the electrical contact elements 11, 21 according to the comparative example, without this leading to an impairment of the properties relevant to the contact elements 11, 21.

The invention claimed is:

1. An electrical contact element for a plug-in connector, having: (a) a metallic base body, (b) a metallic intermediary layer, which is applied to the metallic base body and which has a thickness ranging from 1.5 μm to 4.0 μm, and (c) a wear layer applied to the metallic intermediary layer, wherein the wear layer consists of the following alloy elements:
   50-100% w/w ruthenium
   0-30% w/w nickel
   0-20% w/w chromium
   0-20% w/w cobalt
   0-20% w/w platinum
   0-1% w/w further alloy elements,
      wherein the sum of the alloy elements is 100% w/w,
      wherein an organic slide layer is arranged on the wear layer,
      wherein the organic slide layer has a thickness ranging from 0.05 μm to 0.25 μm, and
      wherein the organic slide layer contains at least one fatty acid salt.

2. The electrical contact element according to claim 1, wherein the wear layer has a thickness ranging from 0.15 μm to 1.50 μm.

3. The electrical contact element according to claim 1, wherein the metallic intermediary layer consists of the following alloy elements:
   99-100% w/w copper or nickel
   0-1% w/w further alloy elements, and
      wherein the sum of the alloy elements is 100% w/w.

4. The electrical contact element according to claim 1, wherein the organic slide layer contains at least one fluoropolymer.

5. The electrical contact element according to claim 4, wherein the at least one fluoropolymer is perfluoropolyether (PFPE) or polytetrafluoroethylene (PTFE).

6. The electrical contact element according to claim 1, wherein the metallic base body consists of the following alloy elements:
   50-100% w/w copper
   0-45% w/w zinc
   0-5% w/w further alloy elements, and
      wherein the sum of the alloy elements is 100% w/w.

7. The electrical contact element according to claim 1, wherein the at least one fatty acid salt is lithium-12-hydroxystearate.

8. The electrical contact element according to claim 1, wherein a metallic slide layer is arranged on the wear layer and the organic slide layer is arranged on the metallic slide layer.

9. The electrical contact element according to claim 8, wherein the metallic slide layer contains an alloy which consists of the following alloy elements:
   98.5-100.0% w/w gold
   0-0.5% w/w cobalt
   0-1.0% w/w further alloy elements, and
      wherein the sum of the alloy elements is 100% w/w.

* * * * *